United States Patent [19]

Rao et al.

[11] Patent Number: 5,319,643
[45] Date of Patent: Jun. 7, 1994

[54] METHOD FOR SHORTENING A DISTRIBUTED QUEUE

[75] Inventors: Sathyanarayana Rao; Reto Beeler; Martin Potts, all of Bern, Switzerland

[73] Assignee: Ascom Tech AG, Bern, Switzerland

[21] Appl. No.: 598,682

[22] PCT Filed: Feb. 6, 1990

[86] PCT No.: PCT/CH90/00024
§ 371 Date: Oct. 16, 1990
§ 102(e) Date: Oct. 16, 1990

[87] PCT Pub. No.: WO90/09711
PCT Pub. Date: Aug. 23, 1990

[51] Int. Cl.⁵ .............................................. H04J 3/24
[52] U.S. Cl. ................................ 370/94.1; 370/85.12
[58] Field of Search ............... 370/94.1, 85.1, 85.4, 370/85.9, 85.5, 85.12, 85.15, 85.14, 60; 359/118, 119

[56] References Cited

U.S. PATENT DOCUMENTS 5,181,202 1/1993 Walser et al. .................... 370/85.5

Primary Examiner—Douglas W. Olms
Assistant Examiner—Dang Ton
Attorney, Agent, or Firm—McAulay Fisher Nissen Goldberg & Kiel

[57] ABSTRACT

A method for shortening a distributed queue, the distributed queue being formed by the first node and the second node which communicate using packets transmitted and received over first and second buses, the first and second nodes having first and second distributed queue images, respectively, which form first and second portions of the distributed queue, respectively, the packets travelling over the first bus having a request mode and a non-request mode and the packets travelling over the second bus having an empty mode and a full mode, the first node creating packets in the empty mode in the non-request mode; the first node has an information queuing state which changes a first packet originally in the non-request mode into the request mode and transmits the first packet over the first bus and adds first information to be sent to the first distributed queue, the first node transmitting information stored in the first distributed queue when second packet in the empty mode and a third packet is the non-request mode are received the first node adds information to the first distributed queue when a fourth packet in the request mode is received; the first node has an information sending state which changes a fifth packet originally in the empty mode into the full mode and transmits the fifth packet over the second bus when sending the first information; the improvement including the steps of monitoring the first bus for first and second consecutive packets in the request mode while the first distributed queue image is empty; and, changing the second consecutive packet into the non-request mode and transmitting the second consecutive packet over the first bus.

12 Claims, 4 Drawing Sheets

METHOD FOR SHORTENING A DISTRIBUTED QUEUE

BACKGROUND OF THE INVENTION

1. Field of the Invention

This invention concerns a method for shortening the distributed queue which exists over a number of nodes connected to a digital transmission line.

2. Description of the Related Art

In "The QPSX MAN", R. M. Newman et al., IEEE Communications Magazine, Vol. 26 (April 1988) No.4, p. 20-28, an arrangement is introduced which digital information is transmitted between several nodes over two non-branching parallel buses. Nodes are situated one after the other and are attached to both buses. Contiguous, address-labelled packets run in one direction only on each of the two buses at the same rate. Every packet contains, in the header part, two bit segments which are necessary to create distributed queues over all nodes. One of these bit segments is used to signify "empty" (E) or "busy" (B). The other bit segment is used to signify "request" (R) or "no request" (N). According to the values of these bits, packets will subsequently be referred to as "empty packets" (E), "information packets" (B), "request packets" (R), and "non-request packets" (N).

The distributed queue enables every node to access the buses at more-or-less any time, which is particularly important when short, urgent messages (e.g. alarms) must be sent. A queue is created when there is a lot of traffic on the bus, by means of a continuously operating protocol. A partial representation (image) of the queue is found in each node. This protocol is described as follows:

In every node, an entry is read into a FIFO (First-In, First-Out) memory whenever a request packet (R) is forwarded, and an entry is read out of the same FIFO memory whenever an empty packet (E) is forwarded in the opposite direction. Through this action, the FIFO memory creates the aforementioned image of the distributed queue.

When a node wants to send information in one direction, it sends a request signal in the opposite direction to that in which it wants to send the information. The node does this by changing the first non-request packet (N) it receives into a request packet (R) and sending this out. It also adds a later-recognisable entry into the FIFO memory.

As soon as the particular entry representing the above request-to-send is read out of the FIFO memory, the node is authorised to send its information. The node does this by filling the next arriving empty packet (E) with its information and sending the packet out as an information packet (B). The next request to send information can then be actioned.

This described protocol operates satisfactorily and balances the access requirements between nodes at all times. A disadvantage, however, is that it is not possible to extend this protocol to genuine ring-structured systems (without special 'head-of-bus' units).

SUMMARY OF THE INVENTION

The purpose of this invention is, on one hand, to eliminate this limitation and, on the other hand, to minimize the length and range (distance along the bus) of the respective distributed queue, thereby also possibly allowing several separate queues to exist next to each other.

In accordance with the present invention, in a method for shortening a distributed queue which exists across a number of modes connected to a digital transmission line, wherein on one of two non-branching parallel bases, contiguous empty packets and information packets run in one direction and on the other of the two bases, request packets and non-request packets run in the other direction and with the sam transmission rate, wherein at one place, empty packets are generated on one bus and non-request packets on one bus and non-request packets are generated on the other bus, wherein the nodes are connected to both buses and every node receives and transmits information packets, wherein every mode which wants to send information, successively changes an arriving non-request packet into a request packet, transmits it, and inserts its own request into its own distributed queue image and as soon as the authorization to send has been signaled, fills an empty packet with the information, marks it as an information packet and transmits it, the improvements comprising that at least one node generates empty packets and non-request packets and that every node, which has either itself generated an empty packet or has forwarded a received empty packet and which has been so authorized by its own distributed queue image, for every such empty packet it changes an arriving request packet into a non-request and forwards it as such.

The advantages of this solution follow from the purpose of the invention. This means, that it is now possible to create distributed queues on any type of transmission topology (particularly now also on ring structures). Furthermore, the average number of associated nodes in a distributed queue is decreased, so that the average access delay is substantially reduced.

For a better understanding of the present invention, reference is made to the following description and accompanying drawings while the scope of the invention will be pointed out in the appended claims.

FIG. 1 illustrates a first transmission topology.
FIG. 2 illustrates a second transmission topology.
FIG. 3 illustratrates a packet format.
FIG. 4 presents a symbolic form procedure in a node.
FIG. 5 is a first block diagram of a FIFO memory.
FIG. 6 is a second block diagram of a FIFO memory.
FIG. 7 is a third representation of a FIFO memory.

DETAILED DESCRIPTION OF THE INVENTION AND PREFERRED EMBODIMENTS

Figure 1:
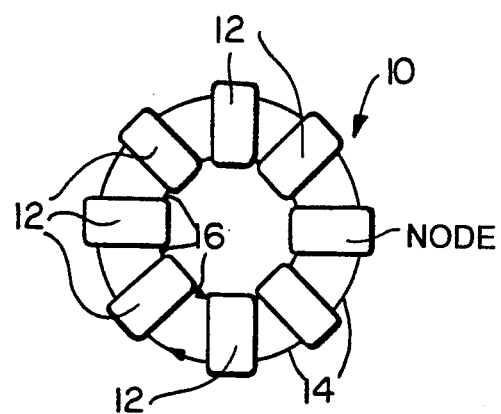

FIG. 1 shows a first transmission arrangement 10 with several (e.g. eight) identical nodes 12. These are attached to two ring-shaped buses 14 and 16. Bus 14 is driven in a clockwise direction, and bus 16 is driven in a counter clockwise direction. The nodes 12 are connected to the buses 14 and 16 in such a way that information on the buses also passes through the nodes.

Figure 2:
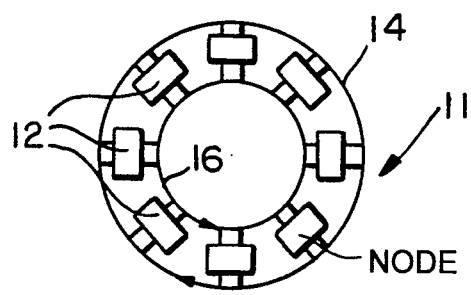

FIG. 2 illustrates a second transmission arrangement 11 which is constructed in quite a similar way to that in FIG. 1. The difference is that in FIG. 2, the nodes 12 are connected to the buses 14 and 16 in such a way that the information essentially remains on the buses and nodes 12 read from—and written to—the passing packets.

Figure 3:
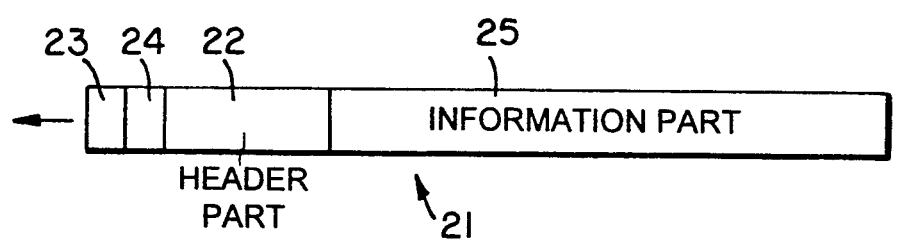

Address-labelled packets 21 run contiguously on the buses 14 and 16 at the same rate. FIG. 3 shows one of these packets. It is divided into a header part 22 and an information part 25. The information part may follow directly after the header part, or appear at a later point in time. In the header part 22, two fields 23 and 24 (preferably each one bit wide) are indicated, which are used to signify the packet type. The field 23 denotes whether it is an "empty packet" (E) or an "information packet" (B), and the field 24 is used to differentiate between "request packets" (R) and "non-request packets" (N).

Since it is fundamentally possible with the current state-of-the-art for the transmission arrangement 10, 11 to carry information on both buses 14 and 16, on the bus for the chosen direction of transmission, the field 23 (E or B) of the packet header part 22 is used, and on the bus running in the opposite direction, the field 24 (R or N) of the packet header part 22 is used. In this way, fields 23 and 24 are used for independent operations for both directions.

Figure 4:
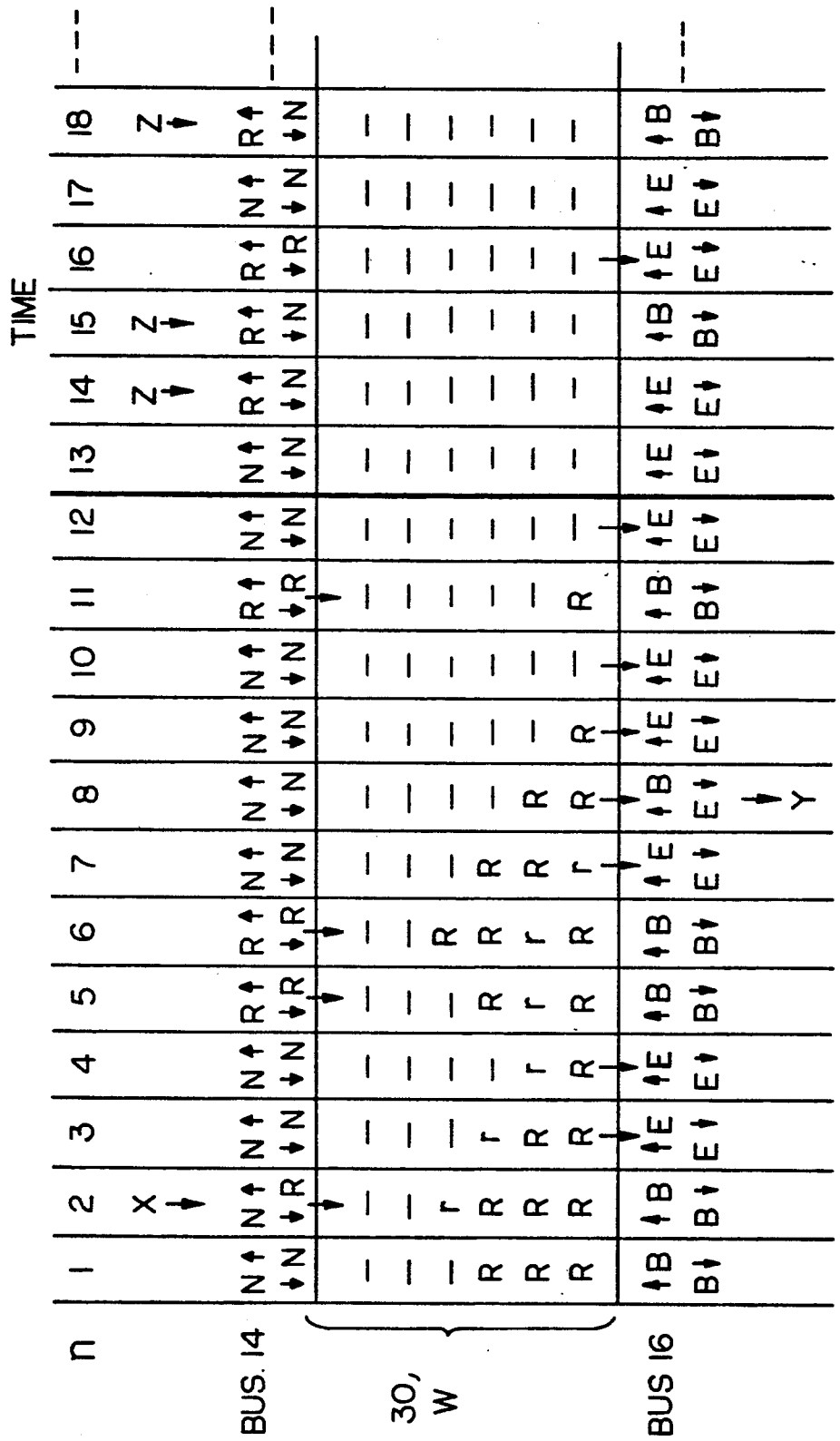

FIG. 4 shows (for a single direction of transmission and a single node 12) the operation of the queue W. This queue W changes step-by-step, as packets 21 pass by on the buses 14 and 16. These steps n are numbered on the top line, beginning with 1. In the second line, events X and Z are shown. These will be described later.

In the third line, is shown the types of packet (R or N) arriving at—and leaving—the node 12 in question during each of the respective steps n on the bus 14. In the middle of the figure, the particular distributed queue image w for this node is shown. This image relates to the previously described FIFO (First-In, First-Out) memory, and shows how many requests R have to be handled before a new "own-request" r can be released.

Finally, in the last line, is shown the types of packet (E or B) arriving at—and leaving—the node 12 in question on the opposite bus 16.

The distributed queue W, together with its image w in each node, are created and emptied in accordance with the aforementioned well-known protocol. This operation is explained in detail below, in conjunction with FIG. 4:

Step 1: The image w currently contains 3 requests R. On the bus 14, arrives a non-request packet N which is forwarded unchanged, and on the bus 16 arrives an information packet B which is also forwarded unchanged. The image w is unaffected.

Step 2: The node now wants to send information (on bus 16). This event is indicated by the symbol X. On bus 14 arrives a non-request packet N which, because of the fact that the node now wants to send information (X), is changed to a request packet R and sent out. The request to send information is entered into the node's image w of the distributed queue W (and thereby into the distributed queue W itself) as a request r, which can therefore be recognised later. On the bus 16 arrives an information packet B which is forwarded unchanged.

Steps 3 and 4: On the buses 14 and 16 arrive, respectively, a non-request packet N and an empty packet E. Due to the empty packets E on bus 16, the length of the image w diminishes each time by one R entry.

Steps 5 and 6: On the buses 14 and 16 arrive, respectively, a request packet R and an information packet B. Due to the request packets on bus 14, the length of the image w increases each time by one R entry, to a length of 4 requests again.

Steps 7 to 10: On the buses 14 and 16 arrive, respectively, a non-request packet N and an empty packet E. Due to the empty packets E on bus 16, the length of the image w diminishes each time by one, to a length of zero.

At step 8, the own-request r was read out which allowed the node to send its information in the subsequent empty packet E which became changed to an information packet B. This event is indicated by the symbol Y.

Step 11: On the buses 14 and 16 arrive, respectively, a request packet R and an information packet B. Due to the request packets on bus 14, the length of the distributed queue image w increases by one R entry.

Step 12: On the buses 14 and 16 arrive, respectively, a non-request packet N and an empty packet E. Due to the empty packets E on bus 16, the length of the distributed queue image w diminishes to a length of zero again.

Up to this point, the procedures are the same as are performed in the current state-of-the-art. The following steps 13 to 18 outline the new invention.

Step 13: There is no distributed queue W, the length of the image w is zero (ie. the FIFO memory is empty). On the bus 14 and 16 arrive, respectively, a non-request packet N and an empty packet E.

Steps 14 and 15: Due to fact that the FIFO memory 30 is empty and in both steps 13 and 14 empty packets E arrived on bus 16 and were forwarded unchanged, two arriving request packets R on bus 14 are changed to non-request packets N and sent out as such. These events are indicated by the xymbol Z.

Step 16: At step 15, an information packet B arrived on bus 16. Therefore, in step 16, the request packet R that arrives on bus 14 is unchanged. The FIFO memory 30 is incremented on account of the request packet R, but is then emptied again immediately again as the empty packet E arrives, and is forwarded, on bus 16.

Step 17: On the buses 14 and 16 arrive, respectively, a non-request packet N and an empty packet E. [Note that, due to the fact that the FIFO memory 30 is empty and an empty packet E arrives on bus 16 and is forwarded unchanged, the next arriving request packet R on bus 14 can be changed to a non-request packet N.]

Step 18: The same as step 15.

From the example in FIG. 4, the following general procedures and conditions are derived:

In every node 12, whose FIFO memory 30 is empty, for every empty packet E transmitted/forwarded in one direction (eg. on bus 16), one request packet R in the other direction (ie. on bus 14) is changed and sent out as a non-request packet N. Information packets B which are emptied by the node 12 itself and then transmitted as empty packets E, have the same effect as arriving empty packets E which are forwarded.

On a ring-shaped transmission arrangement 10, 11, at least one node 12 must be able to replace used packets as empty packets E. Preferably, however, many—or even all—nodes 12 should have the capability to be a source for empty packets E. In this way, the cancelling of request packets R, as outlined; ie. by changing them respectively into non-request packets N, results in a shortening of the distributed queues W, as well as a reduction in the range (distance along the bus) of these queues. Furthermore, the average access delay for all nodes is decreased, because fewer request packets R are present and therefore the average time until an empty packet which can be used by the respective node 12 crosses by the request packet R is reduced.

The method of shortening a possibly already-existing distributed queue W, as described above, is based on the principle that, when the FIFO memory 30 is empty, for every immediately following empty packet E that is transmitted/forwarded, a request packet R can be changed into a non-request packet N. This is actually an unnecessary restriction. In fact, it must only be ensured that for as many empty packets E that are transmitted/-forwarded during a (not too long) time interval T1, the same number of request packets R are changed into non-request packets N in a subsequent equal time interval T2. The length of the time interval, T, can be fixed as corresponding to (for example) ten packet lengths. The optimum value for the time interval T, however, can be shown to be when it is chosen individually for each node 12 to be exactly the length of time taken for a packet to travel from this node 12 to the neighbouring one in the direction of the bus 16 (ie. the empty/information packets). This special situation results in the minimum reaction time from node to node. On the other hand, this optimisation requires every node 12 to have its own individual value for the time interval T, which must be set either manually, or (better) automatically. Furthermore, the time intervals, T1 and T2, could be altered after every packet, in order to obtain, more-or-less as the system is running, an averaging of the occurrence of empty packets E and request packets R.

Figure 5:
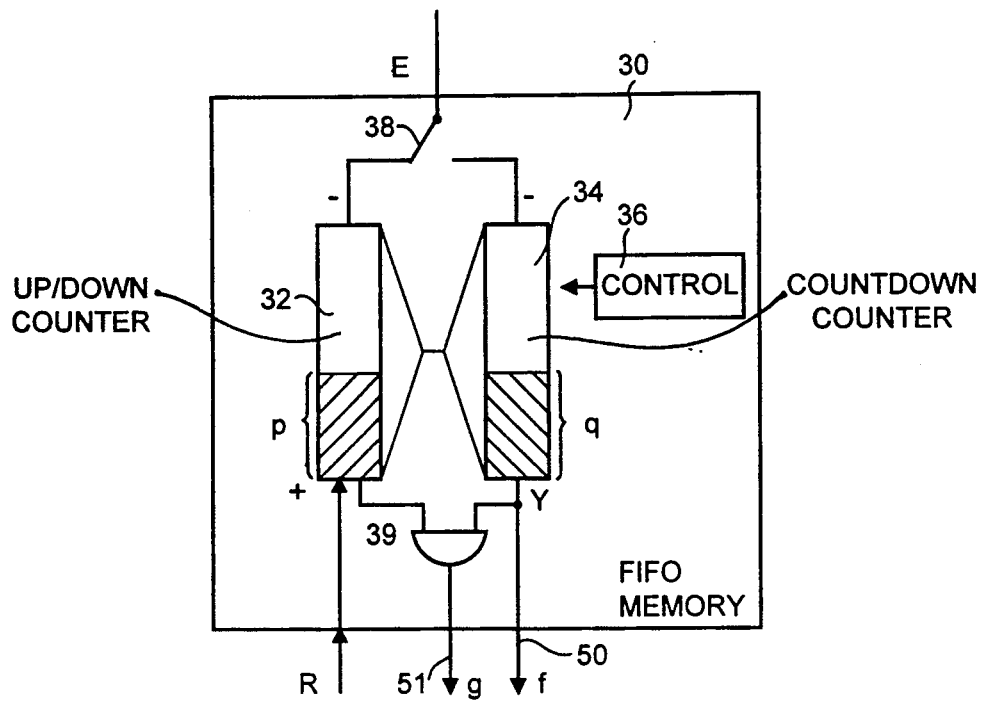

FIG. 5 shows a first block diagram of the FIFO memory 30 for the image w of the distributed queue W. This memory is built as a unit comprising an up/down counter 32 a countdown counter 34, a switch 38, an AND gate 39 and an associated control 36. The counter 32 is incremented by 1 with every passing request packet R and is decremented by 1, (with the switch 38 in the position shown) with every passing empty packet E. The resultant counter value p represents the length of the image w in this part of the distributed queue W. As soon as the node 12 originates an own-request r, the current counter value p is copied parallel across into counter 34 as counter value q. Subsequently, the counter 32 is reset to zero, and the switch 38 is switched through to the countdown counter 34 side. The countdown counter 34 therefore now decrements its counter value q by 1 with every passing empty packet E, and the counter 32 increments its counter value p by one with every passing request packet R. As soon as the value of the countdown counter 34 is equal to zero (event Y in FIG. 4), the node 12 is allowed to send out its next aforementioned own-request r in the form of a request packet R. This own-request r becomes inserted into the distributed queue W in the manner described. Whilst ever the countdown counter 34 is empty (i.e. the counter value is zero), a signal f is present at the output 50. If the counter 32 is also empty, then a further signal g will also be present at output 51 via the AND gate 39. These signals f and g are elaborated in conjunction with FIG. 6.

Figure 6:
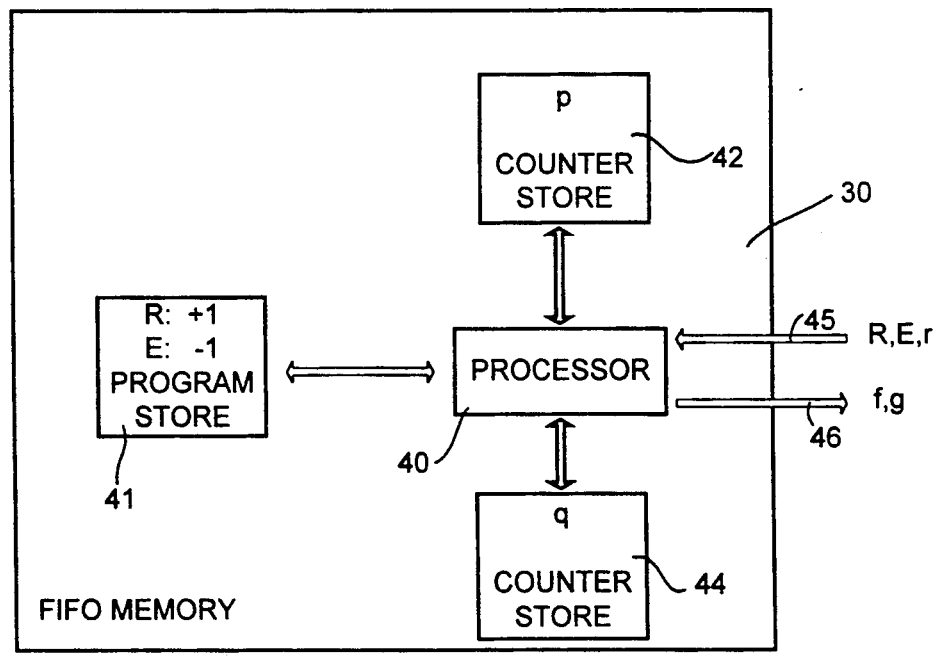

FIG. 6 shows a second block diagram of the FIFO memory 30. This memory 30 comprises a processor 40, a program store 41 and two counter stores 42, 44. This FIFO memory 30 works according to the program in the program store 41, which performs exactly the same function as the switch in FIG. 5. Similarly, the counter stores 42, 44 match the counters 32, 34, i.e. they contain the equivalent of the counter values p and q. The trigger events R, r, E are given to the FIFO memory 30 via the input 45. The output signals f and g appear at the output 46 whenever the counter value q is equal to zero, and the counter values p and q are equal to zero, respectively. The presence of the output signal f allows a new own-request to be initiated. The presence of the output signal g enables an arriving request packet R to be changed into a non-request packet N.

A variant of the FIFO memory 30 in FIG. 5 and 6 is that the counter value p in counter 32, or counter store 42, respectively, is not reset to zero when the current counter value is copied across into the counter 34, or counter store 44, but rather continues to be incremented and decremented as before.

Figure 7:
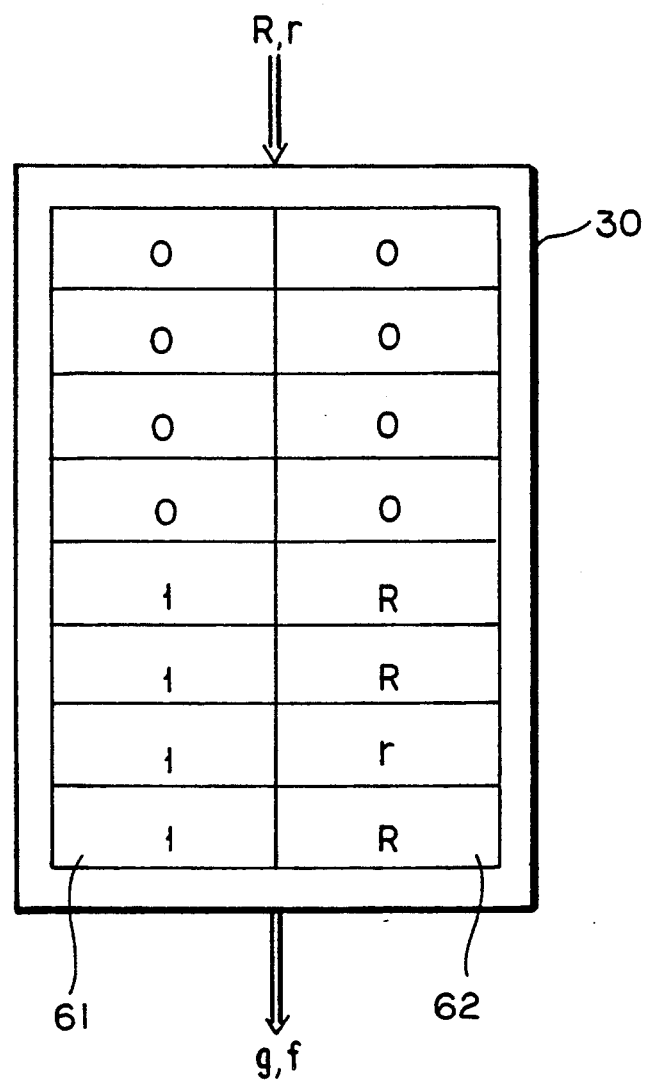

FIG. 7 shows a further variant of the FIFO memory 30. This demonstrates the use of a commercial FIFO memory with (for example) eight storage elements, each comprising several parallel bits. The bits are utilized in such a way that the those in the left-hand column 61, indicate whether the element is empty or occupied (represented by 0 or 1, respectively). The bits in the right-hand column 62, are utilized in such a way as to indicate whether the element is empty (0) or not; and when not empty, to represent either a request type r or R. The FIFO memory 30 is filled through the occurrence of requests R and r, and produces output signals f and g.

Other implementations of the FIFO memory 30 than the three examples outlined here are not excluded.

The method to enable the quick elimination of request packets R has only been outlined for one of the two directions of transmission. The extension of the method to its simultaneous utilization in both directions is straightforward and, in practice is preferred. In such cases, the fields 23 and 24 of every packet 21 are utilized independently of each other for each direction of transmission.

The method is basically applicable to any transmission arrangement having two parallel buses 14, 16 running in opposite directions. Ring-shaped transmission systems, however, are especially suitable for this method.

The fields 23 and 24 in the header part 22 of the packet 21, serve to differentiate between empty packets E and information packets B, as well as between request packets R and non-request packets N. For this differentiation, it is sufficient that each field is just one bit wide. However, it is not excluded that, on the grounds of required redundancy, or otherwise, that the fields 23 and 24 are extended to a width of two or more bits.

While the foregoing description and drawings represent the preferred embodiments of the present invention, it will be obvious to those skilled in the art that various changes and modifications may be made therein without departing from the true spirit and scope of the present invention.

What is claimed is:

1. In a method for shortening a distributed queue which exists across a number of nodes connected to a digital transmission line,
    said transmission line including:
        a non-branching, first bus having empty packets and information packets continuously travelling in a first direction at a given transmission rate;
        a non-branching, second bus having request packets and non-request packets continuously travelling opposite said first direction at said given transmission rate, said second bus being parallel to said first bus; said nodes being connected to said first bus and to said second bus, said nodes receiving and transmitting said information packets;
    at least one of said nodes generating said empty packets and said non-request packets;

each of said nodes maintaining a respective dynamic image, the respective dynamic image of each of said nodes controlling transmissions of each of said nodes;

said method comprising the steps of:

inserting a request into said respective dynamic image;

successively changing arriving non-request packets into request packets and transmitting said request packets; and, changing an arriving empty packet into an information packet and transmitting said information packet when permitted by said dynamic images; and, wherein each of said nodes having produced or retransmitted an empty packet changes one arriving request packet into a non-request packet and transmits said non-request packet to shorten the distributed queue.

2. The method of claim 1 wherein a plurality of said nodes produce said empty packets and said non-request packets.

3. The method of claim 1 wherein each of said nodes produce said empty packets and said non-request packets.

4. The method of claim 1 wherein said dynamic image always permits transmission when said dynamic image is empty.

5. The method of claim 1 wherein each of said nodes having said dynamic image permitting transmission and having produced an empty packet or having retransmitted a received empty packet changes an immediately succeeding arriving request packet into said non-request packet and transmits said non-request packet.

6. The method of claim 1 wherein each of said nodes whose said dynamic image gives said allowance and who has produced an empty packet or has retransmitted a received said empty packet within a succeeding time interval of a given length changes said arriving request packet into said transmitted non-request packet.

7. The method of claim 6 wherein said length of said time interval is equal to the runlength of said node to the neighboring node in said first direction.

8. The method of claim 1 wherein each said packet for said first direction and for said second direction shows whether it is an empty packet or a said information packet and whether it is a said request packet or a said non-request packet, respectively.

9. A device for using a method of claim 1, wherein each of said nodes comprises a FIFO store for said dynamic image, wherein said FIFO store builds up two stepwise changing counter positions, wherein said FIFO store comprises at least one input for putting in signals about said request packets passing the said node, said empty packets and the said node's said own requests, and wherein said FIFO store comprises at least one output for outputting signals about the instant said counter positions.

10. The device of claim 9 wherein said FIFO store comprises an add-subtract counter, a subtract counter, a switch, an AND-gate and an allocated control, wherein said switch connects a first input of said FIFO store with said add-subtract counter or said subtract counter, respectively, wherein the output of said subtract counter is the one output of said FIFO store, and wherein said AND-gate connects the outputs of said add-subtract counter and the output of said subtract counter with other output of said FIFO store.

11. The device of claim 9 wherein said FIFO store comprises a processor with allocated a program store and two counters.

12. The device of claim 9 wherein said FIFO store comprises a plurality of storage cells, and wherein each of said storage cell comprises some parallel bit positions being split into two columns.

* * * * *